(12) United States Patent
Bretschneider et al.

(10) Patent No.: US 6,449,869 B1
(45) Date of Patent: *Sep. 17, 2002

(54) DEVICE AND METHOD FOR DRYING POURABLE PRODUCTS

(75) Inventors: Frank Bretschneider, Liegau-Augustusbad (DE); Bruno Peter, Einbeck (DE); Jürgen Brückner, Dresden (DE)

(73) Assignees: Glatt Systemtechnik Dresden GmbH, Dresden (DE); KWS Saat AG, Einbeck (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/554,102

(22) PCT Filed: Sep. 22, 1999

(86) PCT No.: PCT/DE99/03095

§ 371 (c)(1),
(2), (4) Date: May 24, 2000

(87) PCT Pub. No.: WO00/16887

PCT Pub. Date: Mar. 30, 2000

(30) Foreign Application Priority Data

Sep. 24, 1998 (DE) .................... PCT/DE98/02843

(51) Int. Cl.⁷ ................................. F26B 17/30

(52) U.S. Cl. ............... 34/59; 34/166; 34/173; 34/174; 366/286

(58) Field of Search .............. 34/58, 59, 166, 34/168, 173, 174; 366/286, 305, 307, 314

(56) References Cited

U.S. PATENT DOCUMENTS

| 3,671,296 A | * | 6/1972 | Funakoshi et al. .......... 427/212 |
| 3,782,643 A | * | 1/1974 | Carpenter, Jr. ............... 241/60 |
| 4,504,020 A | | 3/1985 | Nishida et al. |
| 4,724,794 A | | 2/1988 | Itoh |
| 4,826,325 A | * | 5/1989 | Iwata et al. ................. 366/221 |
| 5,296,265 A | | 3/1994 | Okuma et al. |
| 5,582,644 A | * | 12/1996 | Gaddis et al. |
| 5,902,042 A | * | 5/1999 | Imaizumi et al. |
| 6,217,206 B1 | * | 4/2001 | Kirjavainen et al. |
| 6,237,244 B1 | * | 5/2001 | Bryan et al. ................... 34/59 |

FOREIGN PATENT DOCUMENTS

| DE | 4128258 | 2/1993 |
| DE | 4411058 | 4/1997 |
| JP | 07047261 | 2/1995 |

* cited by examiner

*Primary Examiner*—Jiping Lu
(74) *Attorney, Agent, or Firm*—Jacobson Holman, PLLC

(57) ABSTRACT

Device and method for drying a pourable products. The device includes a rotor chamber in which a rotor is arranged with a vertical rotor axis. The rotor has a central horizontal surface and, at least in its radially outer third, a conical shell which is inclined to the axis of rotation by 20° to 70°, in such a way that the end face of the conical shell has the largest diameter and is located at the top. The conical shell has, at least partially, sheet-like gas passages in the form of perforations or screens. The method for drying pourable products provides for dry gas to be fed in a sheet like manner to the products to be dried during the radially peripheral circulation of the products without the products being swirled up and being exposed to unacceptable compressive, concussive and/or frictional loads.

6 Claims, 2 Drawing Sheets

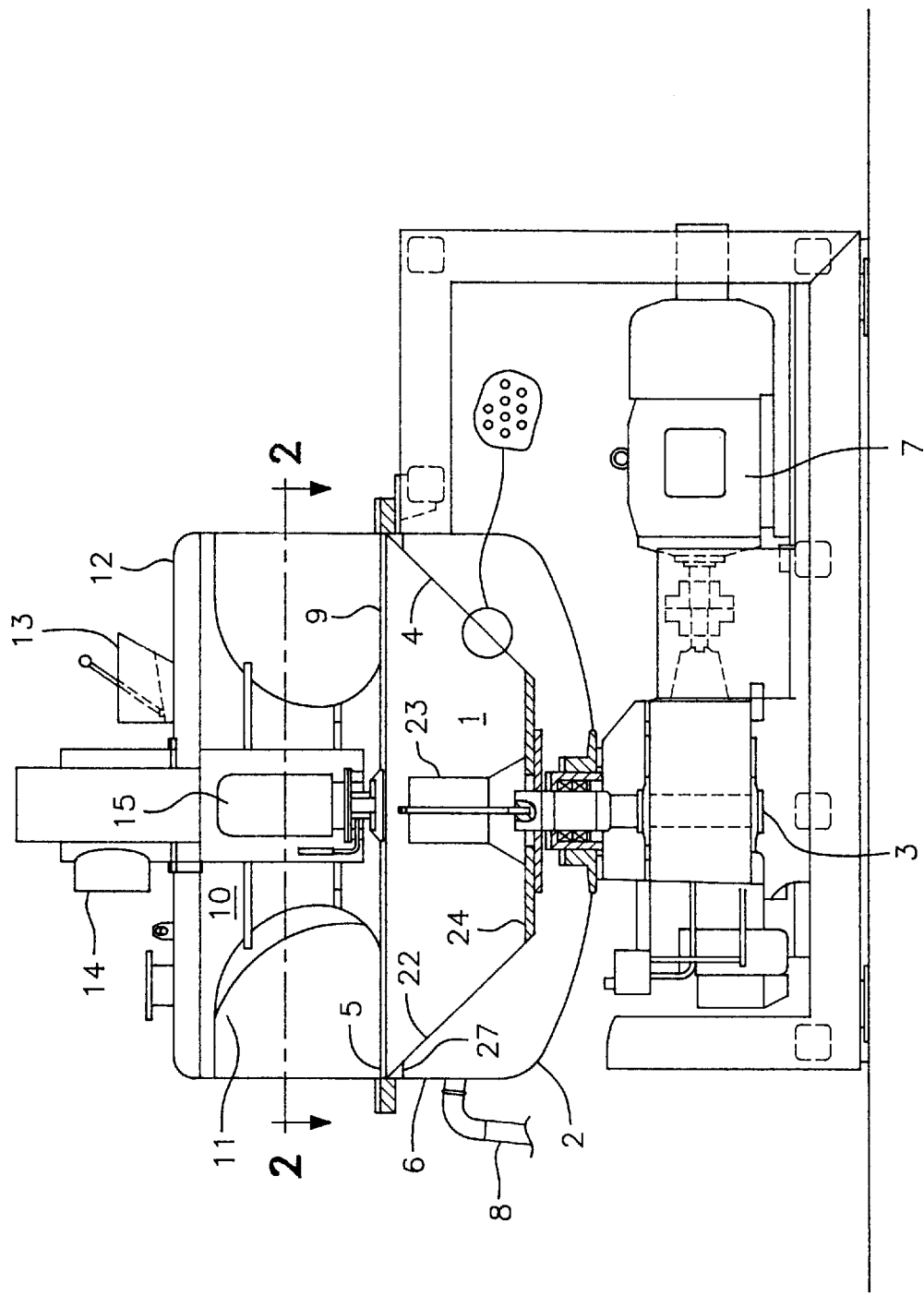

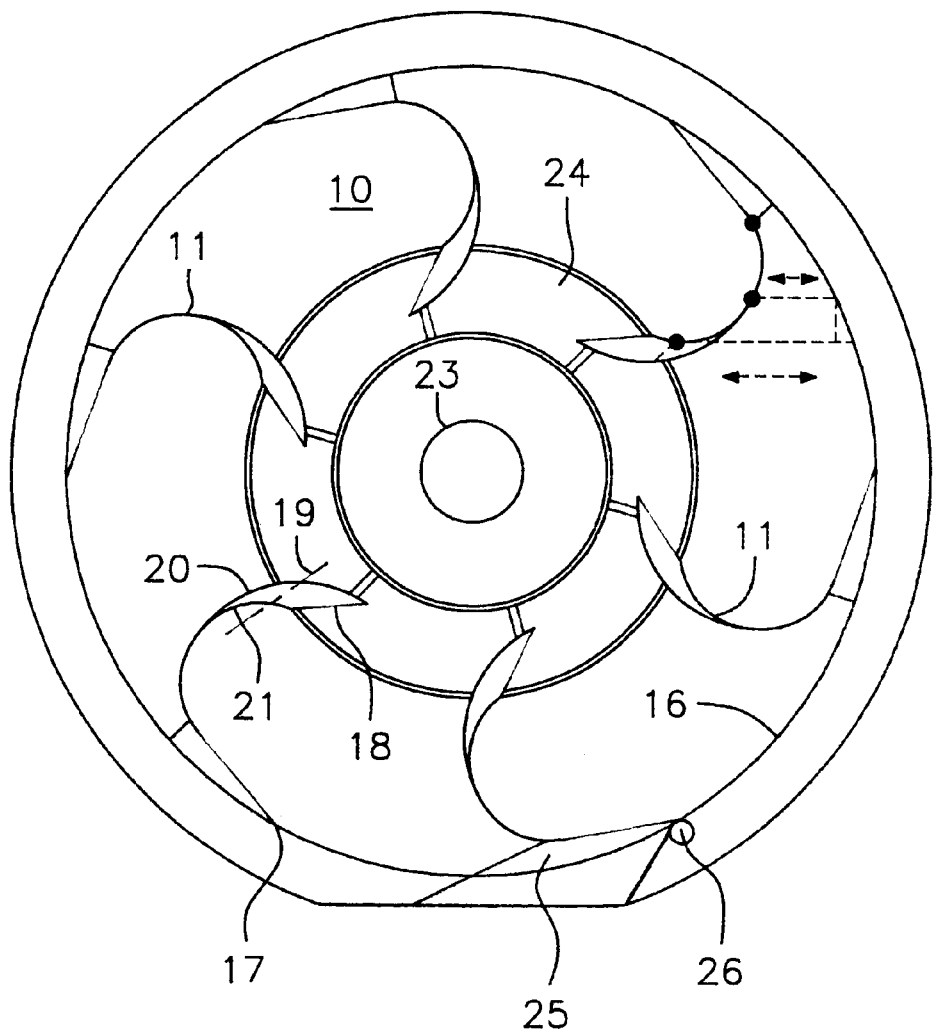

DEVICE AND METHOD FOR DRYING POURABLE PRODUCTS

CROSS-REFERENCE TO RELATED APPLICATIONS

This application is related to pending U.S. application Ser. No. 09/555,095, having the same inventors and same filing date as the present application.

BACKGROUND OF THE INVENTION

1. Field of the Invention

The invention relates to a method and device for drying pourable products within a rotor chamber. The pourable products are put into radially peripheral circulation by a rotor having a vertical rotor axis.

The product may basically be of any kind, insofar as it is possible to direct the product into radially peripheral circulation. The product is thus also designated more specifically as a pourable product. In practice, it usually includes product particles which are homogeneous in a material-specific way or cores, to which any desired moist enveloping layer has been applied in previous method steps. The application of a moist enveloping layer may also take place in parallel with drying, in such a way that the enveloping layer is dried immediately during and after application.

Pourable products may, in this context, be all solid particles, fragments or elements which can be put into radially peripheral circulation by a rotor, for example granulates, pellets, grains, tablets, pills and the like. All products of this kind may be homogeneous, agglomerate or a core already provided previously with one or more layers.

An enveloping layer may consist of one substance or of a mixture of a plurality of substances.

2. Description of Related Art

According to the prior art, various methods and devices for drying granulates or pourable products are known.

In fluidized-bed drying methods, a dry gas acts upon the product from below, in such a way that the product is swirled up, the dry air removing the moisture from the products.

JP 07047261 A specifies a device for the treatment of particles by fluidized-bed drying, in which the dry gas is led through a rotating horizontal gas-permeable disk, the gas passage being larger in the outer region than near the axis. The particles located above the disk are moved radially outward as a result of the rotation of the disk and are swirled up by the dry gas.

For the circulation of products in a rotor chamber, for example, DE 4411058 C2 is known. This specifies a device for the coating of granular material, in particular for the coating of seed with chemicals, such as dressing agents.

The device has a conically upwardly widened side wall of a mixing cylinder which rotates at high speed and which is rotatable about a vertical axis. The liquid chemicals are sprayed via a spray device onto the granular material located in the mixing cylinder. For the better intermixing of the granular material in the mixing chamber, bent diverting blades are arranged above the mixing cylinder on a discharge ring, said diverting blades deflecting the material and leading it downward back into the conical mixing cylinder. In this case, the diverting blades are designed in such a way that the granular material is deflected from the outer upper edge of the mixing cylinder into the center.

The solutions according to the prior art all entail the risk that delicate products, or the cores with a delicate enveloping layer which at least temporarily has a moist and therefore soft surface, are subjected to compressive and frictional forces in such a way that the products or the enveloping layers are unacceptably damaged.

SUMMARY OF THE INVENTION

The object on which the invention is based, therefore, is to specify a device for drying pourable products, whereby the products can be dried carefully and effectively. In particular, pourable products having a soft and delicate surface layer are capable of being dried. The object is, furthermore, to specify a method for using the device.

In accordance with the invention, the product to be dried is put into radially peripheral circulation in a very careful way and, at the same time, a dry gas is led through sheet like gas passages in the conical shell of the rotor and through the circulating product.

The direction of movement of the product is, in this case, influenced by the rotor, in such a way that the individual particles of the product are moved radially outward and upward and subsequently fall back onto the rotor essentially due to gravity.

According to the invention, the product is deflected into a central direction by guide vanes, on which the product rolls. In a further refinement, the guide vanes may also have an adjusting mechanism, such that the geometry of the guide vanes can be adjusted. The device can consequently be adapted universally to the optimum circulation characteristics of different products with a varying configuration and mass. Devices of this kind may also be used for the compensation of changing mass ratios during drying.

The dry gas flows round the product very effectively and virtually at every point, the product not being exposed to any adverse compressive loads. The type of dry gas, its flow velocity and its temperature are influenced critically by the specific conditions of the respective product.

The device according to the invention is designed, in principle, as a batch-fed plant, since drying requires a certain amount of time. It is also possible, however, to operate the device as an interval flow plant. That is to say, the product to be dried is fed to the rotor chamber at intervals through an inlet orifice and, after an appropriate process duration, is discharged from an outlet orifice again.

In a discharge solution which has proved appropriate in this case, there is at least one flap in the wall of the rotor chamber above the annular gap between the rotor and the rotor chamber, said flap being suitable for moving the products out of the rotor chamber by means of the centrifugal forces when the flap is in the open position and rotor is rotating.

By means of the device according to the invention, delicate products can be dried very effectively and in a simple and careful way. The products, in particular delicate soft paste enveloping layers on cores, are not appreciably deformed during drying and their external configuration has a high degree of uniformity.

The invention is explained in more detail below with reference to an exemplary embodiment.

BRIEF DESCRIPTION OF THE DRAWINGS

FIG. 1 shows a device according to the invention in a diagrammatic sectional illustration.

FIG. 2 shows a horizontal section above the guide vanes 11 according to FIG. 1.

DESCRIPTION OF PREFERRED EMBODIMENTS

In one exemplary embodiment, seed grains of relatively different size and different shape are to be coated with an enveloping layer, to be dried in parallel with this coating step, and are then to be finally dried.

The seed grains, designated in an example as cores, may, in an equivalent way, also be materials from the chemical industry, the food or fodder industry, agricultural technology, pharmacy or such like branches of industry.

The device according to the invention includes a rotor chamber 1 with a lower housing 2, in which a partially conically designed rotor 4 is arranged centrally in a vertical rotor axis 3. The central part of the rotor 4 is covered by a central rotor sleeve 23. The radially adjoining portion 24 is designed horizontally. A cone shell 22 with an angle of inclination of 50° to the rotor axis 3 starts approximately in the middle of the radius.

According to the invention, in the exemplary embodiment, the entire cone shell 22 is manufactured from a perforated metal sheet with holes having a diameter of 0.8 mm.

The upper edge 5 of the rotor 4 reaches close up to the inner wall 6 of the lower housing 2.

An electric motor drive 7 for the rotor 4 is located below the lower housing 2.

The upper edge 5 of the rotor 4 and the upper edge of the lower housing 2 lie essentially in one plane 9. Above this plane 9 is arranged a guide vane ring 10, as illustrated in more detail in FIG. 2 in the top view (section above the guide vanes 11 according to FIG. 1). For the sake of greater clarity, only two guide vanes 11 are indicated in FIG. 1.

Above the guide vane ring 10 is located the upper housing 12 which closes off the rotor chamber 1 upwardly. Located in the upper housing 12 are a feed orifice 13 for the cores to be coated, a feed 14 for a dry starting material and a central feed 15 for a liquid binder.

In the example (FIG. 2), the guide vane ring 10 having a diameter of approximately 1500 mm, six guide vanes 11 are arranged. The guide vanes 11 have about the height of the guide vane ring 10, the outer edge 17 being integrally formed, free of steps and edges, onto the inner wall 16 of the guide vane ring 10, that is to say, in practical execution, being welded on and ground down.

In the example, the guide vanes 11 are in the shape of a segment of a spiral, the outer edge 17 being the far-polar point and the inner edge 18 the near-polar point of the segment of the spiral. In this case, the integral forming of the spiral on to the inner wall 6 satisfies essentially the theoretical requirement that the outer ends of the guide vanes 11 emerge from the circle of the inner wall 6 of the rotor chamber 1 in the direction of rotation of the rotor 4, in such a way that the tangents of the inner wall 6 and of the guide vanes 11 at the contact point have essentially the same inclination.

The inner ends of the guide vanes 11, and the edges 18, are located approximately in the middle part of the rotor radius.

It has proved to be advantageous if the vertical line 19 has, approximately in the middle of the guide vanes 11, a slight oblique position relative to the perpendicular, in such a way that the lower edge 20 of the guide vanes 11 is shaped further out in the direction of rotation of the rotor 4 than the upper edge 21.

For the purpose of discharging the finished product from the rotor chamber 1, a guide vane 11 has located in it a discharge orifice which, in the coating and final-drying phase of the method, is closed, free of edges and gaps, by means of a flap 25. The flap 25 can be pivoted about the center of rotation 26, with the result that the discharge orifice is opened.

The functioning of the device according to the invention will be described in more detail below, using the method according to the invention.

As already mentioned, seed grains are to be coated uniformly with an enveloping layer, so that a pourable product having a uniform spherical external shape is formed. The coated seed grains are to be dried in parallel with and subsequently to this coating.

The enveloping layer is composed of a pulverulent starting material and a liquid binder.

In the exemplary embodiment, the cores to be coated are introduced into the rotor chamber 1 batchwise via the feed orifice 13 while the rotor 4 is running. Immediately after the cores impinge on the rotor 4, they are put into a radially tangential direction of movement and, by the cone shell 22 in the outer rotor portion, increasingly into a vertically tangential direction of movement. The starting materials for building up the enveloping layer are subsequently fed to the cores slowly and in parallel via the feeds 14 and 15 into the rotor chamber 1. In this case, in the exemplary embodiment, via the feed 14, pulverulent cellulose and, via the central feed 15, liquid methyl cellulose as binder are introduced. The feed 14 is of shovel-like design, with the result that the pulverulent cellulose is applied linearly above the rotor 4 to the circulating cores.

The central feed 15 has a centrally rotating centrifugal disk which distributes the methyl cellulose used as binder to the cores in an annular manner. The practical impingement surface can be increased substantially by a variation in the rotational speed of the centrifugal disk, for example a sinusoidal change in rotational speed.

A dry gas is introduced below the rotor 4, via the two gas inlets 8, even before the cores are introduced. This dry gas flows through the perforated metal sheet of the cone shell 22 and the annular gap between the upper edge 5 of the rotor 4 and the inner wall 6 of the lower housing 2. The stream of dry gas is regulated in such a way that the individual cores, both without and subsequently with a coating, are not swirled up, but, instead, the drying gas merely flows with uniform intensity around and through the circulating product. The product, at the same time, is lifted slightly, so that circulation takes place with an extremely low surface load. The specific way in which the drying gas flows around the product also, in this case, allows highly effective drying.

The product is then dried on in a particularly careful and effective way, even while the product is being produced, and later, after the production of the product has ended, is finally dried to a defined degree of moisture.

The central rotor sleeve 23 and the radially adjoining horizontal portion 24 of the rotor 4 ensure that the centrifugal force is always higher at every point on the rotor than the forces of adhesion of the starting materials or already partly coated cores to one another and to the rotor 4.

If the rotor sleeve 23 is absent, the rotational force at the center of the rotor 4 may theoretically have the value zero and partly coated cores may cake together.

The rotational speed of the rotor 4 is selected in such a way that the cores are moved by the kinetic energy beyond the upper edge 5 of the rotor 4 into the guide vane ring 10. At the same time, the cores or the partly coated cores pass into the active region of the guide vanes 11 and consequently roll along on the inner surface of the guide vanes 11 in an impact-free and concussion-free manner, the vertically tangential direction of movement of the cores during entry into the active region of the guide vanes 11 being essentially deflected and, at the same time, having a central direction superposed on it. After leaving the guide vanes 11, the cores fall into the rotor 4 again and come once more under the influence of the rotor 4, and the closed circuit recommences.

By operation of the specific device according to the invention, an extremely uniform intensive circulation of the cores occurs, the dry gas flowing around the cores simultaneously and on all sides. The cores roll on the device, but also among one another.

Contrary to the solutions according to the prior art, in the entire circulation process the cores do not come into concussive or impact contact with any surfaces or edges of fittings.

The movement of the cores varies very greatly, of course, depending on whether the cores are circulated in the lower region of the guide vanes or to a greater extent in the upper region. However, the fundamental movement sequence always remains the same.

After the technologically required parameters have been achieved, the feed of the starting materials is terminated. The circulation process is pursued further under the effect of the dry gas, until the enveloping layer has the necessary degree of drying.

The device may also be varied within a relatively wide range. Thus, it is obviously within the scope of protection of the invention if the product, after already having been enclosed with a layer in a previous process, for example in another device, is only dried in the present device. In this case, specific an/or heated drying gases may also be used.

The invention claimed is:

1. A device for drying pourable products comprising a rotor chamber (1), a rotor (4) defining a vertical rotor axis (3) mounted within said rotor chamber, said rotor (4) having a central horizontal surface and, at least in its radially outer third, the shape of a conical shell (22) with an outward and upward inclination to the rotor axis (3) of between 20° to 70°, such that an end face of the conical shell (22) lies vertically above the central horizontal surface, said conical shell (22) having, at least partially, drying gas passages in the form of perforations or screens, wherein said rotor chamber (1) includes an axially extending cylindrical wall (6), a plurality of guide vanes ( 11) being affixed statically on said wall and above said rotor (4), said guide vanes (11), in cross section to the rotor axis (3), having substantially the shape of a segment of a circle or spiral, the outer ends of said guide vanes emerging tangentially from the wall (6) of the rotor chamber (1) in the direction of rotation of the rotor (4), the tangents of the wall (6) and the guide vanes (11), at the point where the guide vanes emerge from the wall (6), having substantially the same inclination, said guide vanes having inner ends which lie approximately above the middle part of the rotor radius such that the circulating product, which leaves the rotor (4) under the influence of kinetic energy, rolls on an inside surface of the guide vanes (11) and falls back onto the rotor (4).

2. The device as claimed in claim 1, wherein the guide vanes (11) include adjusting means for adjusting the shape of the segments of the circle or spiral.

3. A device for drying pourable product by subjecting the pourable product to drying gas flow and circulation by a rotor comprising a rotor chamber (1), a rotor (4) defining a vertical rotor axis (3) mounted within said rotor chamber, said rotor (4) having a central horizontal surface and, at least in its radially outer third, the shape of a conical shell (22) with an outward and upward inclination to the rotor axis (3) of between 20° to 70°, such that an end face of the conical shell (22) lies vertically above the central horizontal surface, said conical shell (22) having, at least partially, drying gas passages in the form of perforations or screens for receiving gas for drying the product, wherein said rotor chamber (1) includes a wall extending above said rotor and a plurality of guide vanes (11) being affixed statically on said wall and above said rotor (4), and means for circulating the pourable product so that it leaves the rotor (4) under the influence of kinetic energy rolls on the guide vanes and falls back onto the rotor (4) wherein the pourable product is dried by the gas and circulation by the rotor.

4. The device as claimed in claim 3, wherein the rotor (4) is arranged to be exchangeable within said rotor chamber (1).

5. The device as claimed in claim 4, wherein the perforations or screens have different hole diameters or different screen fabrics.

6. A method for using a device as claimed in claim 3 including the step of admitting a drying gas through the perforations or screens for drying said pourable products.

* * * * *